(12) United States Patent
McGinn

(10) Patent No.: US 6,216,251 B1
(45) Date of Patent: Apr. 10, 2001

(54) ON-CHIP ERROR DETECTION AND CORRECTION SYSTEM FOR AN EMBEDDED NON-VOLATILE MEMORY ARRAY AND METHOD OF OPERATION

(75) Inventor: Peter McGinn, Barrington, IL (US)

(73) Assignee: Motorola Inc, Schaumburg, IL (US)

( * ) Notice: Subject to any disclaimer, the term of this patent is extended or adjusted under 35 U.S.C. 154(b) by 0 days.

(21) Appl. No.: 09/302,505

(22) Filed: Apr. 30, 1999

(51) Int. Cl.[7] ................................................... G11C 29/00
(52) U.S. Cl. ................................................................ 714/800
(58) Field of Search ............................ 714/799, 800–805

(56) References Cited

U.S. PATENT DOCUMENTS

| | | | |
|---|---|---|---|
| 4,453,251 | * 6/1984 | Osman | 714/804 |
| 4,660,198 | * 4/1987 | Lyon | 714/15 |
| 4,672,614 | * 6/1987 | Yoshida | 714/764 |
| 4,692,922 | * 9/1987 | Kiriu et al. | 714/183.13 |
| 4,760,560 | 7/1988 | Ariizumi et al. | 365/189 |
| 4,764,927 | 8/1988 | Izumita et al. | 371/39 |
| 4,768,193 | * 8/1988 | Takemae | 714/711 |
| 5,040,179 | * 8/1991 | Chen | 714/758 |
| 5,265,098 | * 11/1993 | Mattson et al. | 714/182.09 |
| 5,455,939 | * 10/1995 | Rankin et al. | 395/182.4 |
| 5,592,499 | * 1/1997 | Tanoi | 714/773 |
| 5,615,222 | * 3/1997 | Wright et al. | 714/805 |
| 5,872,802 | * 2/1999 | Knaack et al. | 714/800 |
| 6,067,656 | * 5/2000 | Rusu et al. | 714/768 |

\* cited by examiner

*Primary Examiner*—Albert DeCady
*Assistant Examiner*—Shelly A Chase
(74) *Attorney, Agent, or Firm*—Lee E. Chastain; Joanne P. Gariazzo; Robert L. King

(57) ABSTRACT

A microcontroller (100) has a CPU (102) and memory (104). Memory (104) contains a memory array (200). A large portion of the array (200) is used to contain functional data for the CPU (102), but the array (200) also contains one or a few rows of memory content parity information. Once the array (200) is written with lasting data and/or software, a parity controller (208) will generate initial parity values which correlate to the contents of the memory array (200). This parity information is stored within the parity portion of the array (200). After generating the initial parity data, the parity controller (208) occasionally, upon some parity checking event, generates current parity from the data stored within the array (200). This current parity is compared against the parity portion of the array (200) using the parity logic (210). If errors are detected, it is clear that the software/data that was intended to be static and non-changing has experienced a leakage error, soft error event, electrical short, etc. Once these errors are detected corrective measures may be taken to extend the reliable life of the product.

38 Claims, 4 Drawing Sheets

ON-CHIP ERROR DETECTION AND CORRECTION SYSTEM FOR AN EMBEDDED NON-VOLATILE MEMORY ARRAY AND METHOD OF OPERATION

FIELD OF THE INVENTION

The present invention relates generally to electrical systems, and more particularly to, a low-overhead error correction and detection methodology used on secure, embedded non-volatile smart card memories.

BACKGROUND OF THE INVENTION

Consumer electronics continue to shrink in physical size while manufacturers of consumer devices continue to demand improved performance, additional functionality, lower power, and more design flexibility. As examples, manufacturers are today making cell phones that are no bigger than a cigarette lighter, smart cards that contain kilobytes of information and advanced security features, and hand held devices which are communicating and processing at rates that were only possible on workstations a short decade ago. In order to accommodate these smaller and higher performance devices, the semiconductor industry has continued to produce integrated circuits with increasingly smaller feature sizes (0.5 microns or less), radically new packaging techniques and materials, and with much faster frequencies of operation (50 MHz or above). In addition, these products are being made using processes that are much more complex than that used for microcontroller (MCU) applications just years ago. Due to the increasing complexity of the integrated circuits (ICs), increasing process complexity, and the ever increasing capacity of memory required within consumer electronic devices, consumer integrated circuits have now progressed to a point where it is very difficult to guarantee 10 years or more of reliable data retention. Such long-term and reliable retention within the embedded non-volatile memory (NVM) of a consumer product is crucial, else the product will generally not obtain competitive market acceptance.

In the past, 10 years or more of NVM data retention was guaranteed by manufacturing embedded consumer devices that were much larger and more conservative than the most aggressive technology available. However, in order to meet the performance, power, size, and flexibility needs of the current market, it is now necessary to use much more aggressive circuit designs and IC. When using more aggressive designs and processes, the 10 year NVM data retention minimum required by the consumer market is much more difficult to consistently achieve. In some cases, yields have fallen, costs have increased, and time to market has suffered. Therefore, a need exists in the industry for a method of guaranteeing error free operation of consumer embedded memory devices for periods of 10 years or longer while simultaneously using more aggressive IC processing, more complex materials and packaging, along with more advanced device structures. In addition, this new method should ensure that the overhead of obtaining such a solution does not significantly impact a size of the IC device or a cost of manufacturing the device.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
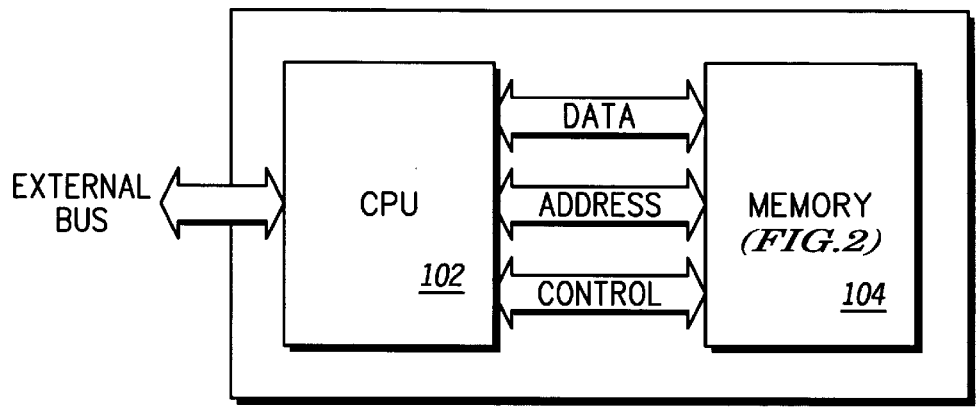
FIG. 1 depicts a block diagram of a microcontroller constructed in accordance with the present invention.

FIG. 1 depicts a block diagram of a microcontroller 100 constructed in accordance with the present invention. Microcontroller 100 includes a central processing unit (CPU) 102 connected to a memory 104 via an ADDRESS bus, a DATA bus, and a CONTROL bus. Microcontroller 100 is also connected to external devices (not shown) via an EXTERNAL bus. Memory 104 includes latch/parity logic (shown in FIG. 2) that detects single bit errors. The latch/parity logic generates a single parity bit for each row and a single parity bit for each column in memory 104. These few bits are easy to determine and minimally impact the net useful area of the memory. The latch parity logic also uses the existing architecture of the memory to perform its memory check and to correct its errors, thus minimizing circuit size and cost. The error detection function of the disclosed invention is a powerful tool useful to diagnose memory failures during design and manufacture. The error correcting function of the disclosed invention is a powerful tool useful to maintain product functionality. Also, the disclosed invention may be advantageously incorporated into secure applications in which CPU 102 is not permitted to access certain restricted regions of memory 104. Instead, memory 104 can perform the error checking and correction functions autonomously of CPU 102.

Continuing with FIG. 1, CPU 102 executes instructions stored in memory 104 using operands also stored in memory 104 and supplied from external sources via the EXTERNAL bus. In one embodiment of the invention, microcontroller 100 is a "smartcard" product, storing sensitive financial information about its owner. For instance, microcontroller 100 might maintain a cash balance of a consumer within memory 104. This balance would be deducted each time the consumer used microcontroller 100 to authorize the purchase of a service or good. Conversely, the consumer could increase the cash balance stored in memory 104 by transferring funds from a bank account to the smartcard. The transfer of funds to and from microcontroller 100 could be accomplished using a radio frequency (rf) interface or by direct connection coupled to the EXTERNAL bus. In this smartcard application, memory 104 is composed of single transistor (1-T) electrically erasable, programmable read only memory (EEPROM). In other embodiments, memory 104 could be composed of other types of memory; static random access memory (SRAM), dynamic random access memory (DRAM), flash EEPROM, etc.

Figure 2:
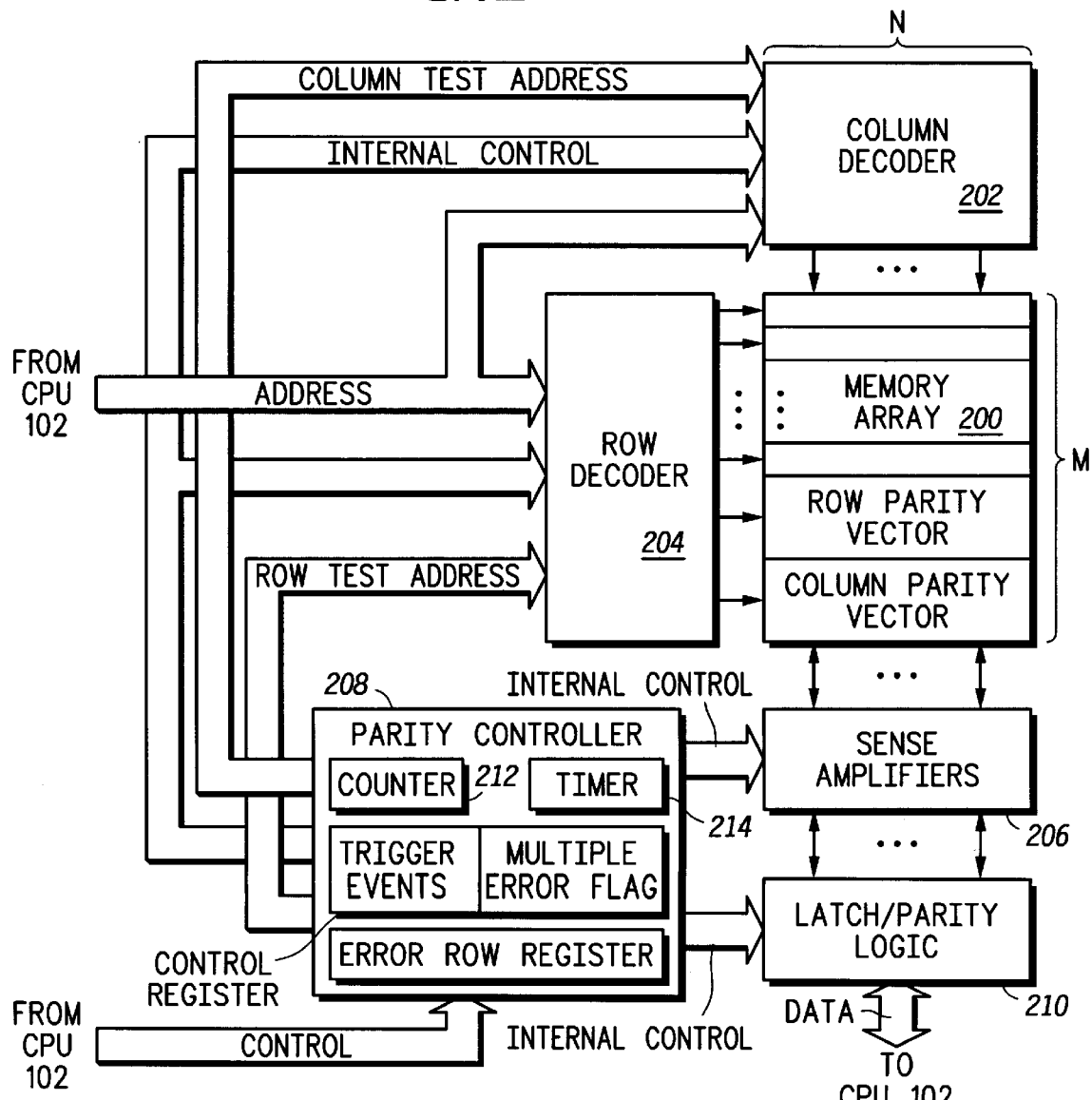
FIG. 2 depicts a block diagram of memory depicted in FIG. 1.

FIG. 2 depicts a block diagram of memory 104 depicted in FIG. 1. Memory 104 contains an N column by M row memory array 200, where M and N are integers, coupled to a column decoder 202, to a row decoder 204, to a block of sense amplifiers 206, and to a parity controller 208. A latch/parity logic block 210 is also connected to the sense amplifiers 206 and to the parity controller 208. Parity controller 208 contains a counter 212, a timer 214, and two registers, CONTROL and ERROR ROW. The CONTROL REGISTER contains a multi-bit TRIGGER EVENTS field and a single-bit MULTIPLE ERROR FLAG. In one embodiment of the invention, the TRIGGER EVENTS field contains a set of single-bit user programmable fields. When set, the event associated with a particular bit will initiate the parity functions described below. When cleared, the event has no effect upon the operation of memory 104. A single-bit field is allocated for each of the following events: an external interrupt, reset, time-out of timer 214, a read instruction performed by CPU 102, a write instruction performed by CPU 102, and continuous operation.

The operation of memory 104 may be conveniently described with respect to its various modes of operation; normal write, normal read, parity generation, parity compare/repair.

In a normal write operation, CPU 102 provides data and address information to memory 104 via the DATA and ADDRESS buses, respectively. Control information is routed through parity controller 208 to the column decoder, row decoder, sense amplifiers, and latch/parity logic. Data present on the CONTROL bus indicates that CPU 102 is performing a write operation. A CAPTURE REGISTER (shown in FIG. 3) within latch/parity logic block 210 temporarily stores the input data and drives the data onto a set of bitlines running through memory array 200. These bitlines couple one memory cell from each row together and to a single sense amplifier. Simultaneously, row decoder 204 and column decoder 202 select all or a portion of a row based on the input address. The input data is then stored into this selected row or subset of a row. As described above, in one embodiment of the present invention, memory array 200 is an array of EEPROM cells. In this embodiment, a relatively high voltage level or levels are applied to the terminals of the memory cell(s).

In a normal read operation, CPU 102 provides the address of certain desired information to memory 104 via the ADDRESS bus. Data present on the CONTROL bus indicates that CPU 102 is performing a read operation. Row decoder 204 and column decoder 202 select all or a portion of a row based on the input address. The data stored in these memory locations is coupled to the bitlines within the memory array and sensed by sense amplifiers 206. Sense amplifiers 206 output the desired data to CPU 102 via the DATA bus.

In a parity generation operation, parity controller 208 first generates a parity bit for the data stored in each column of memory array 200 (column parity vector or bits) and stores these bits into memory array 200. Second, parity controller 208 generates a parity bit for the data stored in each row of memory array 200 (row parity vector or bits). Parity controller also stores these bits into memory array 200. The operation of parity controller 208 during a parity generation operation is more fully described below in connection with FIG. 4.

In the depicted embodiment N and M both equal 512. Therefore, there are 512 row parity bits and 512 column parity bits. These two vectors are stored in 511th and 512th rows of memory array 200, respectively. In other embodiments, these two vectors could be stored in separate registers. Also, if N and M were not equal, then one parity vector might require two rows to store or might require less than a full row to store. Finally, the disclosed invention is described using the convention that sense amplifiers are coupled to columns. This designation of a first dimension within the memory array as a "row" and the second dimension as a "column" is arbitrary.

In a parity compare/repair operation, parity controller 208 also generates a parity bit for the data stored in each row of memory array 200. Parity controller 208 compares the new row parity vector with a previously generated row parity vector. This comparison indicates each row in which an error occurred. Typically, the comparison will generate no more than a single one in a field of zeros, indicating a single failing row. Parity controller 208 will identify this row by identifying the bit position of the single one. This pointer is stored in the ERROR ROW REGISTER. Next, parity controller 208 will generate a parity bit for the data stored in each column of memory array 200. Parity controller 208 compares the new column parity vector with a previously generated column parity vector. This comparison indicates each column in which an error occurred and is stored in the CAPTURE REGISTER with latch/parity logic 210. Again, the comparison will typically generate no more than a single one in a field of zeros, indicating a single failing column. Parity controller 208 (1) reads the contents of the failing row by addressing the row with the contents of the ERROR ROW REGISTER and (2) adds the output, modulo 2, to the contents of the CAPTURE REGISTER. This addition toggles only the bit position identified by the union of the failing row and failing column steps. All other bits in the selected row will not be affected. Finally, this new data value is written back into the row identified by the ERROR ROW REGISTER. At this stage, the entire contents of memory 104 will comply with the previously generated parity vectors. The operation of a parity controller 208 in a parity compare/repair operation is more fully described below in connection with FIG. 5.

Figure 3:
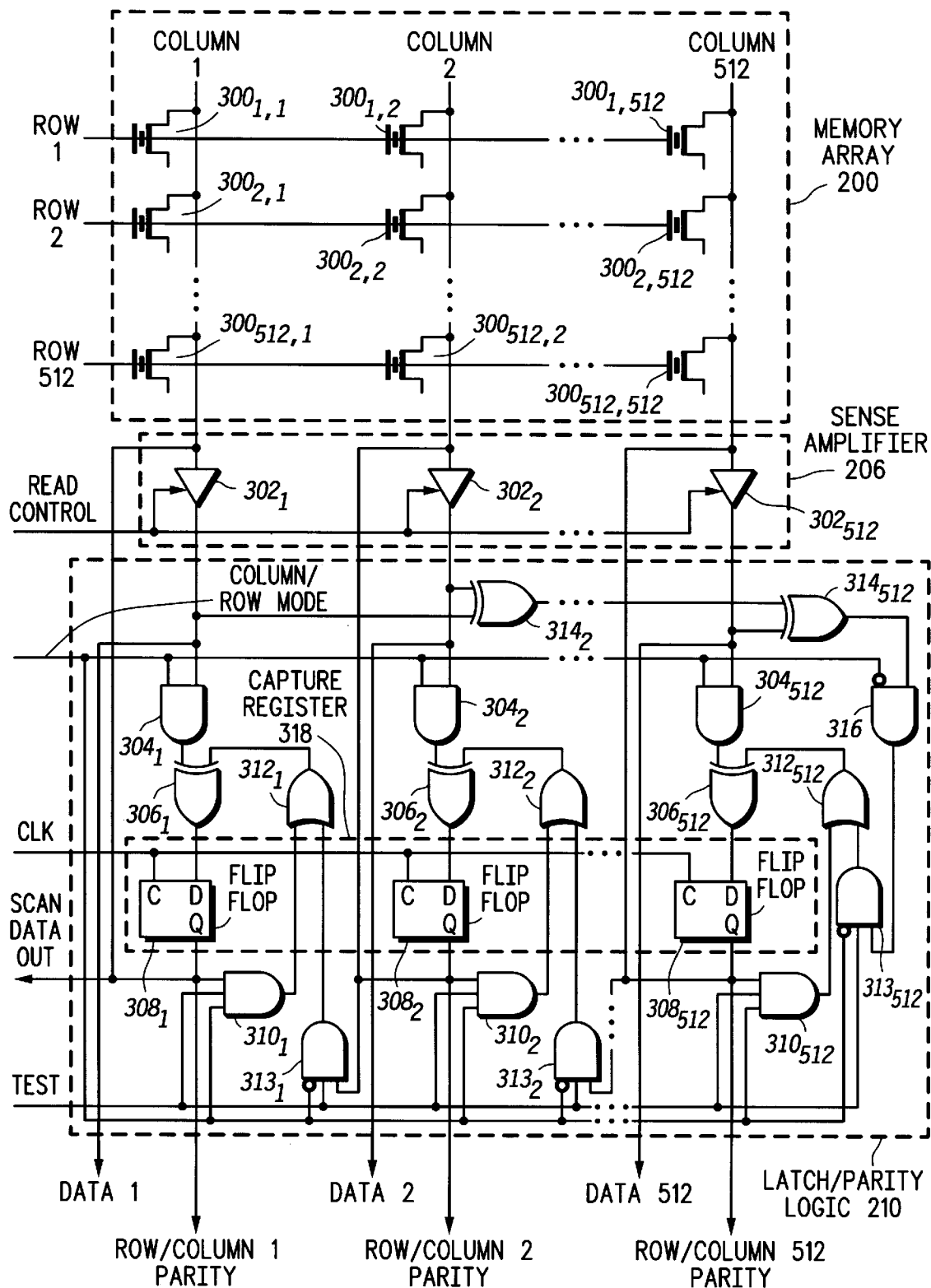
FIG. 3 depicts a partial logic, partial circuit diagram of the memory depicted in FIG. 2.

FIG. 3 depicts a partial logic, partial circuit diagram of memory 104 depicted in FIG. 2. As described above, memory array 200 is formed by 262,144 EEPROM cells $300_{1,1}$ through $300_{512,512}$ arranged along 512 rows and 512 columns. An Ith rowline (labeled Row 1 through Row 512) is connected to the control electrode of each of 512 transistors $300_{1,1}$ through $300_{512,512}$. Similarly, a Jth bitline (labeled Column 1 through Column 512) is connected to a current electrode of each of 512 transistors $300_{1,J}$ through $300_{512,J}$. The Jth bitline is also connected to an input of the Jth one of 512 sense amplifiers $302_1$ through $302_{512}$. Each of the sense amplifiers receives the control signal READ CONTROL. Parity controller 208 generates the control signal READ CONTROL. An output of a differing one of the 512 sense amplifiers $302_1$ through $302_{512}$ is connected to a differing input of latch/parity logic 210. Conceptually, latch/parity logic 210 consists of a single circuit instantiated 512 times. Each circuit receives a single data input and generates a single data output. The first, second, and last circuit instantiations differ slightly from the other 509 circuits.

Generally, the output of the third through 511th sense amplifiers are connected to identical circuits. The output of the Jth sense amplifier is coupled to a first input of an AND gate $304_J$. A second input of AND gate $304_J$ receives the control signal COLUMN/ROW MODE. Controller 208 generates the control signal COLUMN/ROW MODE. An output of AND gate $304_J$ is coupled to a first input of an exclusive OR (XOR) gate $306_J$. An output of XOR gate $306_J$ is coupled to the data (D) input of a D-type flip-flop $308_J$. The clock input of flip-flop $308_J$ is coupled to a controllable periodic clock signal, CLK. Controller 208 generates the periodic clock signal CLK. The data output (Q) of flip-flop $308_J$ generates the Jth output of latch/parity logic 210, is connected to a first input of an AND gate $310_J$, and is connected to the Jth bitline. A second input of AND gate $310_J$ receives the control signal TEST. Controller 208 generates the control signal TEST. A third input of AND gate $310_J$ receives the control signal COLUMN/ROW MODE. An output of AND gate $310_J$ is coupled to a first input of an OR gate $312_J$. A second input of OR gate $312_J$ is coupled to an output of an AND gate $313_J$. A first non-inverting input of AND gate $313_J$ receives the control signal TEST. A second non-inverting input of AND gate $313_J$ receives the data output of the (J+1)th flip-flop $308_{J+1}$. An inverting input of AND gate $313_J$ receives the control signal COLUMN/ROW MODE. An output of OR gate $312_J$ is coupled to a second input of XOR gate $306_J$. Finally, a first and a second input of an XOR gate $314_J$ are coupled to the output of sense amplifier $302_J$ and an output of XOR gate $314_{J-1}$.

The first and second instantiations of latch/repair circuit 210 differ from the general case with respect to XOR gate 314. Specifically, there is no XOR gate $314_1$. Also, the second input of XOR $314_2$ is coupled to the output of sense amplifier $302_1$.

The 512th instantiation of latch/repair circuit 210 differs from the general case with respect to AND gate $313_{512}$, XOR gate $314_{512}$ and by the inclusion of an additional gate, AND gate 316. The second non-inverting input of AND gate $313_{512}$ is coupled to an output of AND gate 316. An inverting input of AND gate 316 receives the control signal COLUMN/ROW MODE. A non-inverting input of AND gate 316 is coupled to the output of XOR gate $314_{512}$.

The 512 flip-flops $308_1$ through $308_{512}$ form CAPTURE REGISTER 318. XOR gates $314_2$ through $314_{512}$ generate a single parity bit representative of the data present on the 512 bitlines during a single row access. The output of the final XOR gate is input to the $512^{th}$ flip-flop in the ROW mode. As parity controller 208 accesses each row, these XOR gates generate a parity bit for each row and shift the bit into the right side of capture register 318. After a certain number of row accesses, capture register 318 will contain an equal number of row parity bits. Conversely, XOR gates $306_1$ through $306_{512}$, AND gates $310_1$ through $310_{512}$, and OR gates $312_1$ through $312_{512}$, form 512 linear feedback shift registers or modulo2 adders. These adders generate a parity bit representative of the data present on a single bitline over multiple read accesses in the COLUMN mode. For instance, these later gates will generate 512 parity bits corresponding to the 512 columns after 510 accesses.

Again, the operation of memory 104 may be conveniently described with respect to its various modes of operation; normal write, normal read, parity generation, parity compare/repair.

In a normal write operation, CPU 102 provides data and address information to memory 104 via the DATA and ADDRESS buses, respectively. Parity controller 208 de-asserts TEST, asserts COLUMN/ROW MODE, and de-asserts READ CONTROL. This combination of control signals routes data input on the Jth bit of the DATA bus to the Jth flip-flop and finally to the Jth bit line. As described above, row decoder 204 will select a row in memory array 200 in which to write the input data.

In a normal read operation, CPU 102 provides the address of certain desired information to memory 104 via the ADDRESS bus. As described above, row decoder 204 and column decoder 202 select all or a portion of a row based on the input address. Parity controller 208 de-asserts TEST, asserts COLUMN/ROW MODE, and asserts READ CONTROL. This combination of control signals enables each of the sense amplifiers to route data output on the Jth bitline onto the Jth bit of the DATA bus.

Figure 4:
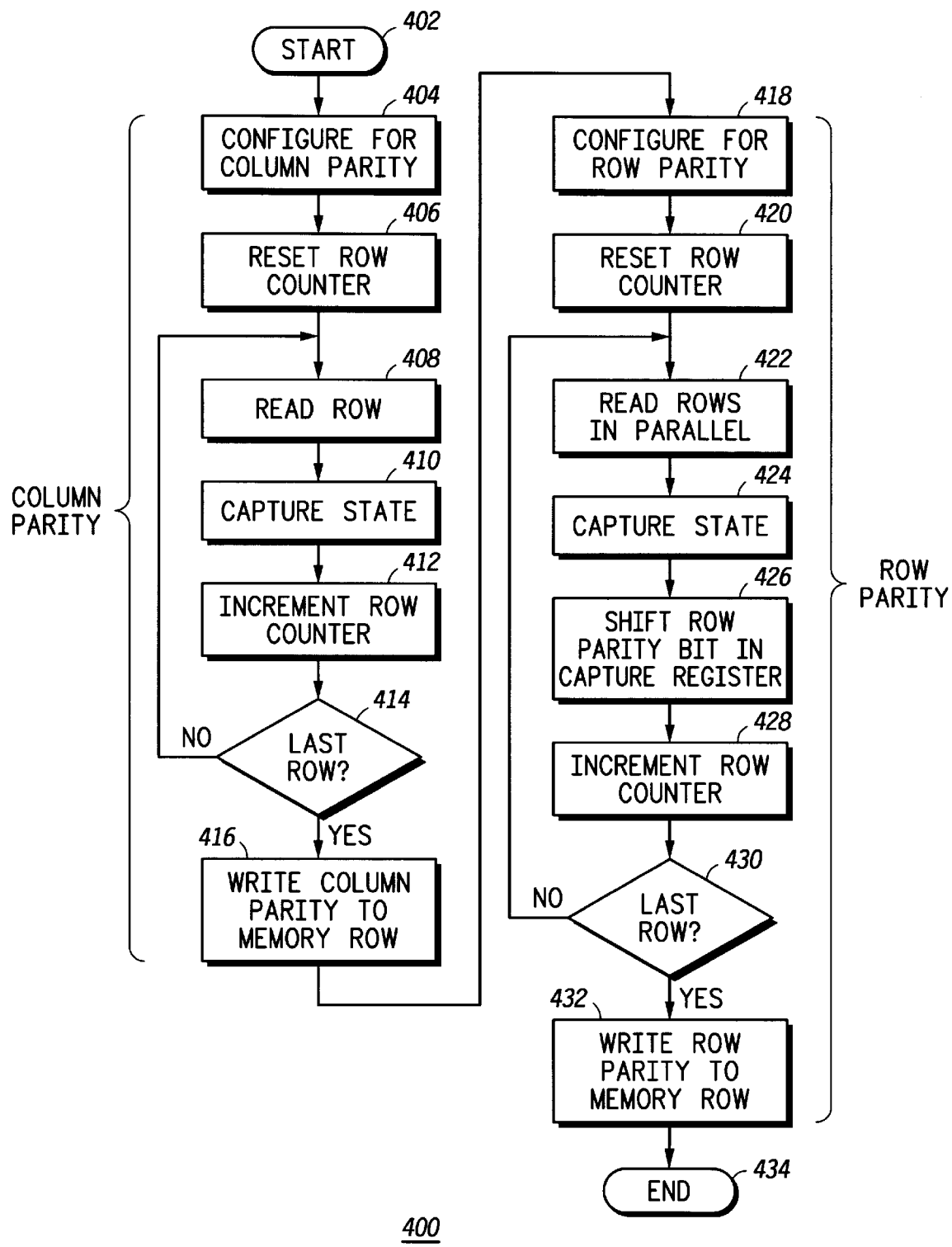
FIG. 4 depicts a flow diagram of a parity generation operation of the parity controller depicted in FIG. 2.

FIG. 4 depicts a flow diagram 400 of a parity generation operation of the parity controller depicted in FIG. 2. The parity generation operation begins at a step 402. Generally, the parity generation operation occurs after every memory write operation. New parity vectors must be created whenever the contents of memory array 200 are changed. In a parity generation operation, parity controller 208 first generates a column parity vector and then generates a row parity vector. Brackets identify these two broad functions in FIG. 4.

During generation of the column parity vector, parity controller 208 first configures latch/parity logic 210 to the COLUMN mode, a step 404. Specifically, parity controller 208 asserts TEST, asserts COLUMN/ROW MODE, and asserts READ CONTROL. This combination of control signals configures the 512 flip-flops within CAPTURE REGISTER 318 as 512 modulo2 adders. Each flip-flop adds the current value output by its corresponding sense amplifier to its previous sum. A modulo2 adder ignores all but the least significant sum bit. This simplified addition results in a single bit that indicates whether an odd or an even number of ones is present in a particular column. Parity controller 208 also resets row counter 212 to an initial value, such as "one," a step 406.

Parity controller 208 then generates the column parity vector by accessing the row indexed by the row counter, a step 408, by latching the contents of the row in the capture register, a step 410, and by incrementing the row counter, a step 412. Parity controller 208 determines if it has accessed all memory locations (excluding the locations reserved for the parity vectors). If row counter 212 indicates that parity controller has accessed the entire array, then parity controller 208 writes the value stored in the capture register to the memory location reserved for the column parity vector, a step 416). The contents of each flip-flop is written into a memory row reserved for the column parity vector by performing a write operation to the reserved memory row without updating the contents of the various flip-flops. If row counter 212 indicates that parity controller 208 has not accessed the entire array, then the parity controller 208 continues processing the array at step 408.

After generating a column parity vector, parity controller 208 generates a row parity vector. During generation of the row parity vector, parity controller 208 first configures latch/parity logic 210 to the ROW mode, a step 418. Specifically, parity controller 208 asserts TEST, de-asserts COLUMN/ROW MODE, and asserts READ CONTROL. This combination of control signals configures the 512 flip-flops within CAPTURE REGISTER 318 as a single scan chain of 512 stages. Parity controller 208 also resets row counter 212 to an initial value, such as "one," a step 420.

Parity controller 208 then begins generating the row parity vector by accessing the row indexed by the row counter, a step 422, by latching the output of XOR gate $314_{512}$, a step 424, by shifting the contents of capture register, a step 426, and by incrementing the row counter, a step 428. During each row access, flip-flop $308_{512}$ receives the modulo2 sum of every bitline as the input to the scan chain. After each row access, the scan chain will be clocked, shifting its data leftwards by one stage. CAPTURE REGISTER 318 will contain a parity bit for each row after performing 510 row reads. Parity controller 208 determines if it has accessed all memory locations (excluding the locations reserved for the parity vectors), a step 430. If row counter 212 indicates that parity controller 208 has accessed the entire array, then parity controller 208 writes the value stored in the capture register to the memory location reserved for the row parity vector, a step 432. The contents of each flip-flop is written into a memory row reserved for the row parity vector by performing a write operation to the reserved memory row without updating the contents of the various flip-flops. If row counter 212 indicates that parity controller 208 has not accessed the entire array, then parity controller 208 continues processing the array at step 422. The parity generation operation ends at a step 434.

Figure 5:
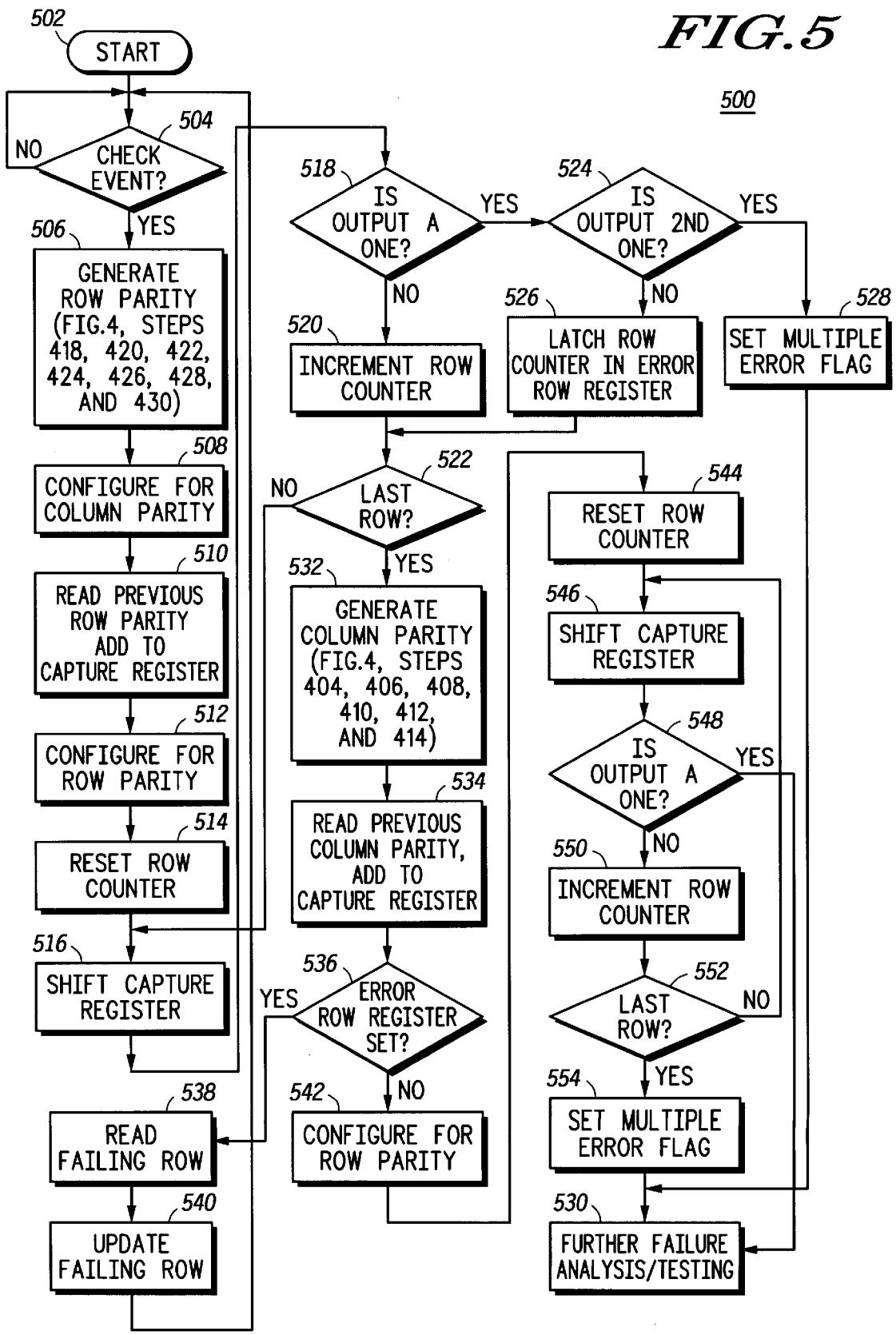
FIG. 5 depicts a flow diagram of a parity compare/repair operation of the parity controller depicted in FIG. 2.

FIG. 5 depicts a flow diagram 500 of a parity compare/repair operation of the parity controller depicted in FIG. 2. The parity compare/repair operation begins at a step 502. Parity controller 208 waits until an enabled triggering event occurs, a step 504. As described above, parity controller 208 contains a CONTROL REGISTER that may be programmed to specify which events will cause the parity compare/repair operation to occur. Parity controller 208 continues processing once one of these events occurs. In a parity compare/repair, parity controller 208 generally reverses the broad functions of a parity operation (FIG. 4). Specifically, parity controller 208 first generates a row parity vector, followed by a column parity vector. Depending upon the results of these two broad functions and its abilities, parity controller 208 may or may not repair a detected bit fault.

Continuing with a step 506, parity controller 208 generates a row parity vector as described immediately above. Step 506 is identical to the set of steps 418, 420, 422, 424, 426, 428, and 430. After generating a row parity vector, parity controller 208 configures latch/parity logic 210 to the COLUMN mode, a step 508, and accesses the previously stored row parity vector, a step 510. As described above, latch/parity logic 210 acts as 512 modulo2 adders in the COLUMN mode. By accessing the previous row parity vector, parity controller 208 logically adds the previous row vector and the current row vector, modulo2. This sum generates a bit map in which parity differences are recorded as ones and parity equivalencies are recorded as zeros.

Next, parity controller 208 de-asserts COLUMN/ROW MODE to configure the various flip-flops into a serial scan chain, a step 512, resets row counter 212, a step 514, and begins serially shifting out the contents of the CAPTURE REGISTER, a step 516. Parity controller 208 determines if the current SCAN DATA OUT bit is a one (parity error), a step 518. If the SCAN DATA OUT is not a one, then parity controller 208 increments row counter 212, a step 520, and determines if it has shifted out all data from CAPTURE REGISTER 318, a step 522. If parity controller 208 has not shifted out all data, then parity controller 208 continues processing, returning to step 516. Continuing with step 518, if the SCAN DATA OUT bit is a logic one, then parity controller 208 determines if it is the second error, a step 524. If the current error is not a second error, but instead is only a first error, then parity controller 208 saves the contents of row counter 212 into the ERROR ROW REGISTER, a step 526. The count indicates the identity of the failing row. Parity controller 208 continues processing at step 522. If the current error is the second error, then parity controller 208 sets the MULTIPLE ERROR FLAG, a step 528. In the described embodiment, only one error can be repaired. Therefore, parity controller 208 aborts, to a step 530, for further failure analysis and testing upon the detection of the second error.

Continuing after step 522, parity controller 208 generates a column parity vector as described above. Step 532 is identical to the set of steps 404, 406, 408, 410, 412, and 414. After generating a column parity vector, parity controller 208 accesses the previously stored column parity vector, a step 534. As described above, latch/parity logic 210 acts as 512 modulo2 adders in the COLUMN mode. By accessing the previous column parity vector, parity controller 208 logically adds the previous vector and the current vector, modulo2. This sum generates a bit map in which parity differences are recorded as ones and parity equivalencies are recorded as zeros. Parity controller 208 then determines if the ERROR ROW REGISTER was set by the previous row parity operation. If the ERROR ROW REGISTER was set, then either (1) one and only one row contained a single bit error, or (2) only pairs of errors occurred in the same row (or both). The first type of error is correctable. The second type of error is not detectable using row parity. Parity controller 208 reads the failing row (indicated by the ERROR ROW REGISTER) while the various flip-flops are configured as modulo2 adders, a step 538. This access adds the contents of the failing row to the error bit map generated in step 534. The sum of a bit and zero (non-failing position) is the original bit value when using a modulo2 adder. Conversely, the sum of a bit and one (failing bit position) is the inverse of the bit. Therefore, the access to the failing row generates a value stored in CAPTURE REGISTER 318 that is identical for all bit positions except for the failing bit position. After the logical state of the failing bit position is inverted, the contents the various flip-flops are written back into the failing row to correct the error, a step 540. Parity controller 208 returns to step 504.

Returning to step 536, if the ERROR ROW REGISTER is not set, then either (1) no errors occurred during the row parity operation, or (2) only pairs of errors occurred in the same row. The first condition requires no corrective action. Although not detectable by the row parity operation, the second condition is detectable using the column parity vector. The following steps detect this occurrence. Parity controller 208 de-asserts COLUMN/ROW MODE to configure the various flip-flops into a serial scan chain, a step 542, resets row counter 212, a step 544, and begins serially shifting out the contents of the CAPTURE REGISTER, a step 546. Parity controller 208 determines if the current SCAN DATA OUT bit is a one (parity error), a step 548. If the SCAN DATA OUT is not a one, then parity controller 208 increments row counter 212, a step 550 and determines if it has shifted out all data from CAPTURE REGISTER 318, a step 552. If parity controller 208 has not shifted out all data, then parity controller 208 continues processing, returning to step 546. Continuing with step 548, if the SCAN DATA OUT bit is a logic one, then parity controller 208 knows that two same row errors occurred which concealed each other in the row parity operation. (A single row error would have set the ERROR ROW REGISTER in step 536.) A double error is not correctable. Therefore, parity controller 208 sets the multiple error flag, a step 554, and aborts, to step 530, for further failure analysis and testing.

Although the present invention has been described with reference to a specific embodiment, further modifications and improvements will occur to those skilled in the art. It is to be understood therefore, that the invention encompasses all such modifications that do not depart from the spirit and scope of the invention as defined in the appended claims.

What is claimed is:

1. An apparatus comprising:
   a memory array having a plurality of memory cells arranged in M memory rows and N memory columns, the memory array also comprising a plurality of parity storage cells and being formed on a semiconductor substrate; and
   parity circuit located on the semiconductor substrate and being coupled to the memory array, the parity circuit:

(1) reading the N memory columns of data and generating a parity bit for each of the N memory columns to create a column parity vector reflecting bit parity of each column; and (2) reading the M memory rows of data and generating a parity bit for each of the M memory rows to create a row parity vector reflecting bit parity of each row, wherein the parity circuit stores the row parity vector and the column parity vector into the parity storage cells of the memory array.

2. The apparatus of claim 1 wherein the parity circuit further comprising:
capture logic that is coupled to receive a control signal from a parity controller, the capture logic being coupled to the memory array through data lines, the capture logic being operable in one of two modes in response to the control signal, a first mode being a row parity mode which captures the row parity vector and a second mode being a column mode which captures the column parity vector.

3. The apparatus of claim 2 wherein the capture logic is, in either the first mode or the second mode, configured to couple the data lines from the memory array serially through a chain of serially-connected XOR gates to output a parity value to a serial shift register whereby parity bits are serially generated and serially shifted into the shift register over time.

4. The apparatus of claim 3 wherein the capture logic is, in either of the first mode or the second mode, configured to couple each data line from the memory array to a unique flip-flop that contains a feedback path, whereby each unique flip-flop incrementally changes state as the parity controller provides data from the memory array so that multiple parity values are generated in parallel over time.

5. The apparatus of claim 2 wherein the capture logic is, in either the first mode or the second mode, configured to couple each data line of the memory array to a unique flip-flop that has a feedback path, whereby each unique flip-flop incrementally changes state as the parity controller provides data from the memory array so that multiple parity values are generated in parallel over time.

6. The apparatus of claim 1 wherein the parity circuit contains a multiple error flag which is asserted when the parity circuit detects more that one error within the memory array.

7. The apparatus of claim 1 wherein the parity circuit contains an error register which stores a row or column location of an error that is detected in the memory array.

8. The apparatus of claim 1 wherein the parity circuit contains N flip flops that are selectively configured either: (1) as a serial shift register connected to a chain of XOR gates to store parity bits in a serial fashion; or (2) N distinct linear feedback shift registers (LFSRs) that generate N parity bits in parallel to each other.

9. A method for implementing error detection within a memory array, the method comprising the steps of:
generating a first column parity vector reflecting bit parity information of each column of the memory array and storing the first column parity vector into a parity storage portion of the memory array;
generating a first row parity vector reflecting bit parity information of each row of the memory array and storing the first row parity vector into the parity storage portion of the memory array, wherein generating the first column parity vector and first row parity vector is performed by a parity circuit; and
accessing the memory array to generate a second row parity vector and a second column parity vector and using the second row parity vector and column parity vector along with the parity storage portion of the memory array to detect data errors within the memory array over time.

10. The method of claim 9 wherein the memory array is resident within a small electronic consumer device and the step of accessing the memory array to detect data errors within the memory array over time is begun in response to a user of the small electronic consumer device performing a certain triggering event.

11. The method of claim 9 wherein the step of accessing the memory array to detect data errors within the memory array over time is begun in response to a time-out condition of a timer circuit.

12. The method of claim 9 wherein the step of accessing the memory array to detect data errors within the memory array over time is begun in response to a reset of a system containing the memory array.

13. The method of claim 9 wherein the step of accessing the memory array to detect data errors within the memory array over time is done continually in parallel to functional read accesses made to the memory array whereby functional read accesses take priority over the error detection operations.

14. The method of claim 9 wherein the step of accessing the memory array to detect data errors within the memory array over time is begun in response to an external signal that places the memory array into a test mode of operation.

15. The method of claim 9 wherein the step of accessing the memory array to detect data errors within the memory array over time is intermittently done between functional accesses to the memory array in a time multiplexed manner.

16. The method of claim 9 wherein the step of accessing the memory array to detect data errors within the memory array over time is begun in response to the setting of a control bit in a register of a central processing unit (CPU) attached to the memory array.

17. The method of claim 9 wherein the step of accessing the memory array to detect data errors within the memory array over time is begun in response to executing a computer instruction in a central processing unit (CPU) attached to the memory array.

18. The method of claim 9 wherein the step of accessing the memory array to detect data errors within the memory array over time results in the correction of an error in the memory array once the error is detected.

19. The method of claim 18 wherein the error in the memory array is corrected by modulo-2 adding an error vector to the contents of the memory row that contains the error to obtain an added result whereby the added result is written back to the memory row as a corrected result.

20. The method of claim 9 wherein the step of accessing the memory array results in the disabling of a non-functional memory row in the memory array in favor of a redundant row whereby the memory array is programmed to accommodate the addition of the redundant row and the deletion of the non-functional memory row.

21. The method of claim 9 wherein the step of accessing the memory array results in the setting of an error flag bit if more than one error is detected in the memory array.

22. The method of claim 9 wherein a CPU located on the same substrate with the memory array is functionally communicating data to and from the memory array in between times when the step of accessing is occurring within the memory array.

23. The method of claim 9 wherein the memory array contains floating gate nonvolatile memory cells.

24. A method for implementing error detection within a memory array, the method comprising:
- (a) addressing a selected row in the memory array;
- (b) providing each bit within the selected row of the memory array in parallel as a column bit to a unique one of a plurality of one-bit parity capture circuits to capture an incremental parity state;
- (c) assigning a new selected row as the selected row;
- (d) cycling through steps (b)–(d) until a column parity vector is generated collectively in the one-bit parity capture circuits;
- (e) writing the column parity vector into a first portion of the memory array;
- (f) generating a row parity vector from data within rows of the memory array and writing the row parity vector into a second portion of the memory array; and
- (g) accessing the memory array to use the row parity vector and column parity vector along with the first and second portions of the memory array to detect data errors within the memory array over time.

25. A method for implementing error detection within a memory array, the method comprising:
- (a) addressing a selected row in the memory array;
- (b) providing each bit within the selected row of memory through a set of serially-coupled logic gates where an output of the serially-coupled logic gates is coupled to a first storage element of a shift register;
- (c) latching the output of the serially-coupled logic gates into the first storage element of the shift register;
- (d) shifting data in the shift register at some point in time to preserve the output of the serially-coupled logic gates in the shift register;
- (e) assigning a new selected row as the selected row;
- (f) cycling through steps (b)–(f) until the row parity vector is fully generated in the shift register;
- (g) writing the row parity vector into the first portion of the memory array;
- (f) generating a column parity vector from data within rows of the memory array and writing the column parity vector into a second portion of the memory array: and
- (g) accessing the memory array and using the row parity vector and column parity vector alone with the first and second portions of the memory array to detect data errors within the memory array over time.

26. The method of claim 25 wherein the step of accessing the memory array comprises:
- (h) comparing the row parity vector to the second portion of the memory array to obtain a first error vector.

27. The method of claim 26 wherein the step of accessing the memory array further comprises:
- (i) serially scanning through the first error vector to find a row position of an error in the memory array whereby the row position is stored in a storage location.

28. The method of claim 27 wherein the step of accessing the memory array further comprises:
- (j) setting a multiple error flag if more than one error is detected in the first error vector.

29. The method of claim 26 wherein the step of accessing the memory array further comprises:
- (i) providing the first error vector to an encoder to identify a row position of an error in the memory array whereby the row position is stored in a storage location.

30. The method of claim 29 wherein the step of accessing the memory array further comprises:
- (j) comparing the column parity vector to the first portion of the memory array to obtain another error vector.

31. The method of claim 30 wherein the step of accessing the memory array further comprises:
- (k) using the row position and the column parity vector to identify a location of an error in the memory array.

32. The method of claim 31 wherein the step of accessing the memory array further comprises:
- (l) using the row position and the column parity vector to correct the error in the memory array.

33. The method of claim 25 wherein the step of accessing the memory array further comprises:
- (h) comparing the column parity vector to the first portion of the memory array to obtain an error vector that is used to find an error within the memory array.

34. A method for implementing error detection within a memory array, the method comprising:
- generating column parity information from data within columns of the memory array and writing the column parity information into a first portion of the memory array;
- generating row parity information from data within rows of the memory array and writing the row parity information into a second portion of the memory array; and
- accessing the memory array to generate a row parity vector and a column parity vector and using the row parity vector and column parity vector along with the first and second portions of the memory array to detect data errors within the memory array over time, wherein the accessing is performed by using a circuit that can be selectively configured to: (1) either generate a plurality of parity bits in parallel to each other using a plurality of parallel-coupled linear feedback registers (LFRs) having at least one flip-flop each or generate and serial shift parity bits in a serial manner; and (2) process error vectors to more accurately identify a row and/or column position of an error in the memory array.

35. A method for implementing error detection on-chip with a memory array, wherein the memory array has M rows and N columns the method comprising the steps of:
- detecting an error row wherein the error row is whichever of the M rows of memory contains an error;
- generating a column error vector having N bits wherein each of the N bits is either a first logic state when that column position in the error row contains no error or a second logic state when that column position in the error row contains the error;
- reading a content of the error row and adding the content of the error row with the column error vector to obtain a corrected content for the error row; and
- writing the corrected content back into the error row where the error row becomes a corrected row.

36. An apparatus comprising:
- a CPU; and
- a memory coupled to the CPU, the memory comprising:
  - a memory array having a M rows and N columns of memory cells for storage of functional data and one or more additional rows of memory to store parity information;
  - decoder circuitry coupled to the memory array for reading and writing data to certain locations within the memory array;
  - sense amplifiers coupled to input/output data lines of the memory array;

a capture circuit coupled to the sense amplifiers;

a parity controller coupled to the capture circuit and the decoder circuitry; and wherein the parity controller controls the decoder circuitry and the capture circuit so that parity information is generated for the M rows and the N columns, row parity information reflecting parity of bits in rows of the memory and column parity information reflecting parity of columns of the memory, where the row parity information and column parity information are written into the additional rows of the memory upon an initiation event, and wherein the parity controller controls the decoder circuitry and the capture circuit so that parity vectors are generated for the M rows and the N columns so that, upon a parity-checking trigger event, the parity vectors are compared to the additional rows of memory to determine if the memory contains failures.

37. The apparatus of claim 36 wherein row parity information and row parity vectors are generated serially one parity bit at a time by the capture circuit, and wherein column parity information and column parity vectors are generated in parallel N parity bits at a time by the capture circuit.

38. The apparatus of claim 36 wherein failures in the memory are automatically corrected over time by the apparatus without human correction intervention.

* * * * *

UNITED STATES PATENT AND TRADEMARK OFFICE
CERTIFICATE OF CORRECTION

PATENT NO. : 6,216,251 B1
DATED : April 10, 2001
INVENTOR(S) : Peter McGinn

It is certified that error appears in the above-identified patent and that said Letters Patent is hereby corrected as shown below:

<u>Column 9, claim 6,</u>
Line 43, change "that" to read -- than --

<u>Column 11, claim 25,</u>
Line 46, change "alone" to read -- along --

Signed and Sealed this

Eleventh Day of December, 2001

*Attest:*

*Attesting Officer*

NICHOLAS P. GODICI
*Acting Director of the United States Patent and Trademark Office*